No. 645,007. Patented Mar. 6, 1900.
L. C. REED.
PROTECTIVE SYSTEM AND APPARATUS FOR HIGH TENSION ELECTRIC CURRENTS.
(Application filed July 17, 1899.)
(No Model.) 5 Sheets—Sheet 1.

Witnesses.
Inventor:
Lyman C. Reed,
By James L. Norris,
Atty.

THE NORRIS PETERS CO., PHOTO-LITHO., WASHINGTON, D. C.

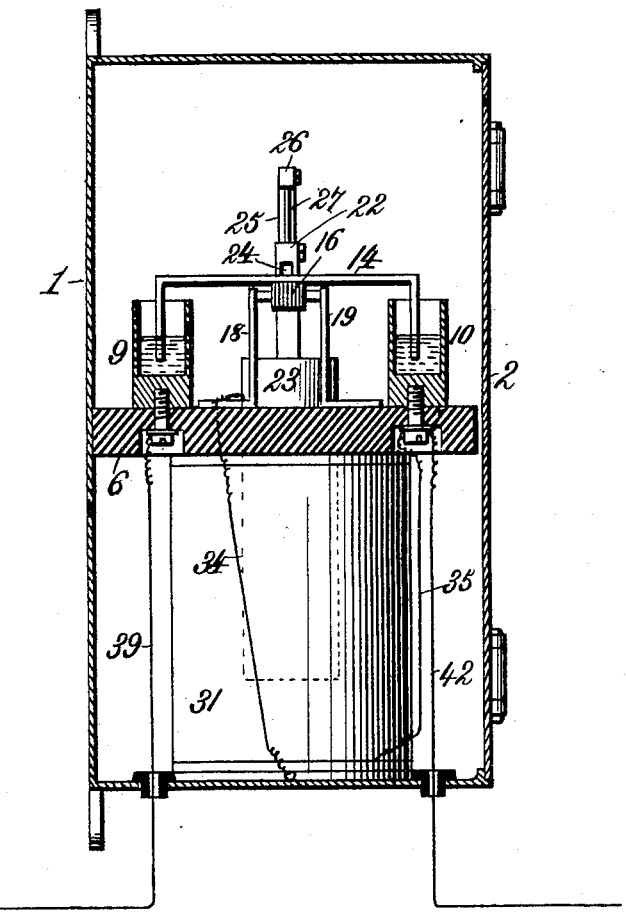

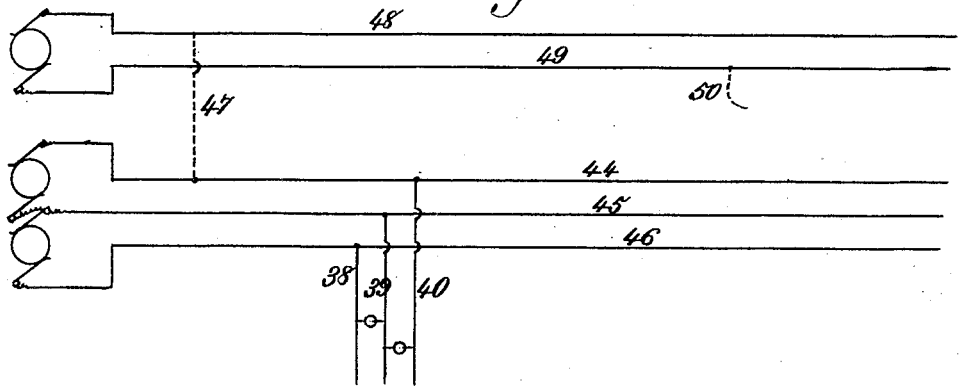
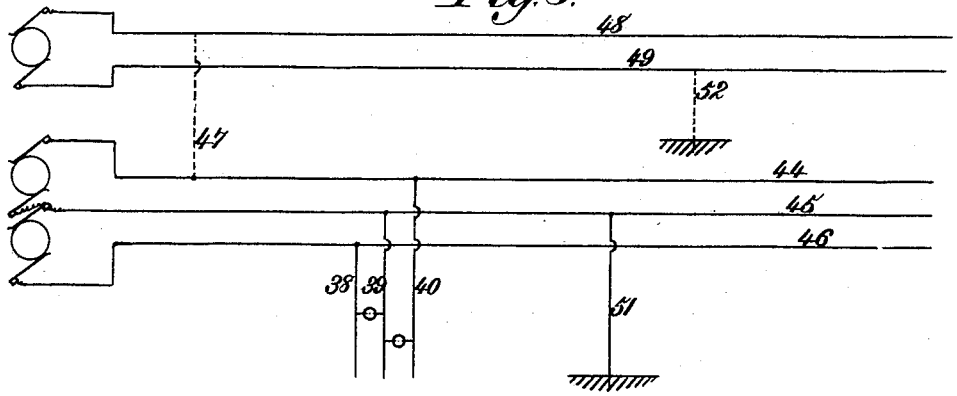
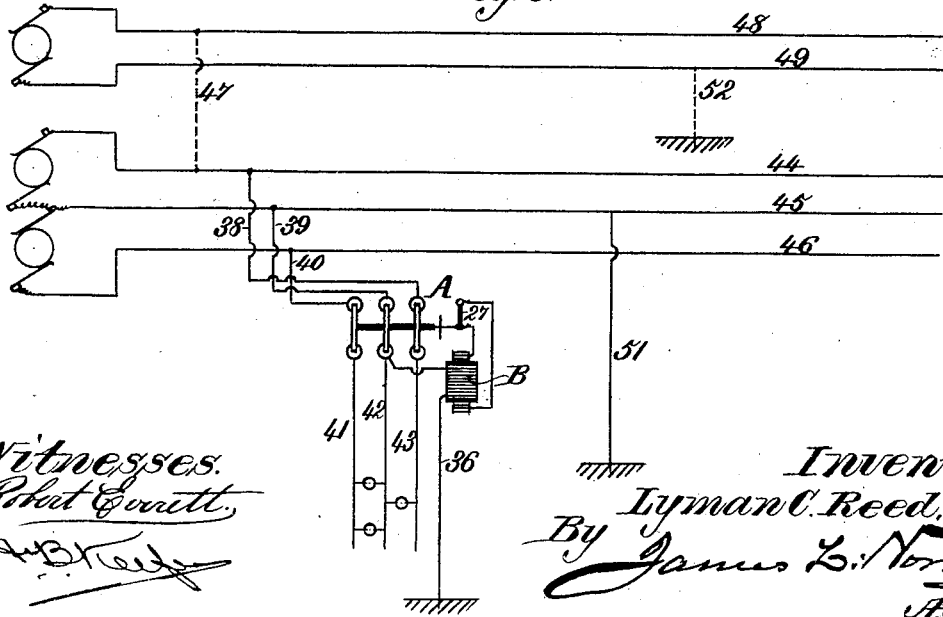

No. 645,007. Patented Mar. 6, 1900.
L. C. REED.
PROTECTIVE SYSTEM AND APPARATUS FOR HIGH TENSION ELECTRIC CURRENTS.
(Application filed July 17, 1899.)
(No Model.) 5 Sheets—Sheet 4.
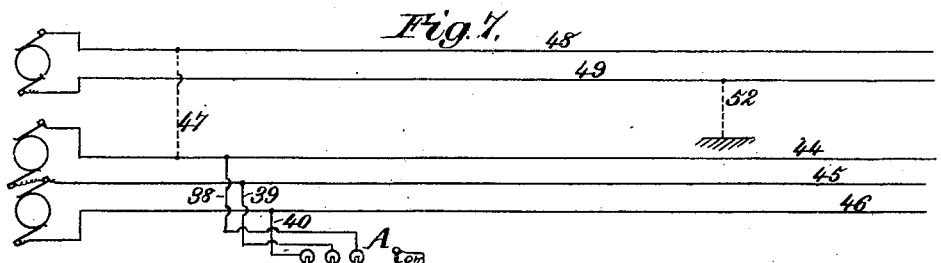
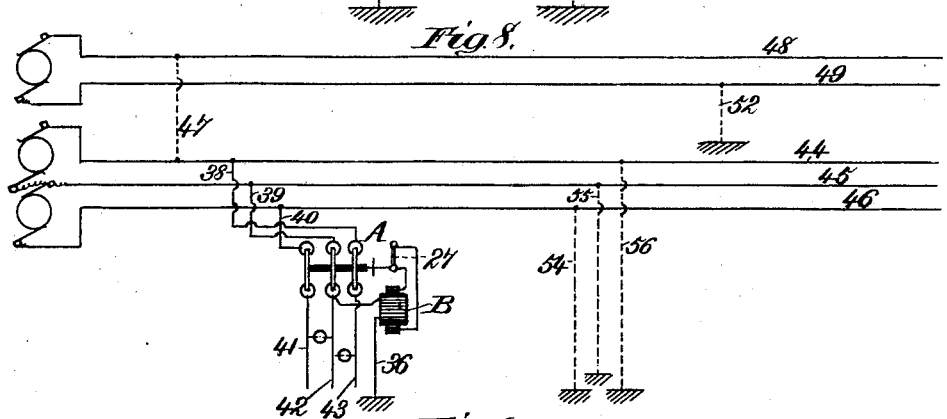
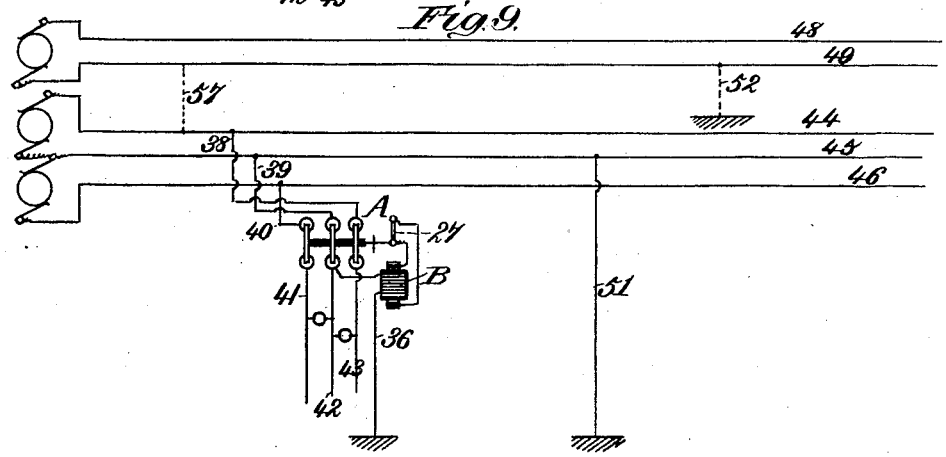
Witnesses
Robert Orrutt
Inventor,
Lyman C. Reed.
By James L. Norris.
Atty.

No. 645,007. Patented Mar. 6, 1900.
L. C. REED.
PROTECTIVE SYSTEM AND APPARATUS FOR HIGH TENSION ELECTRIC CURRENTS.
(Application filed July 17, 1899.)
(No Model.) 5 Sheets—Sheet 5.
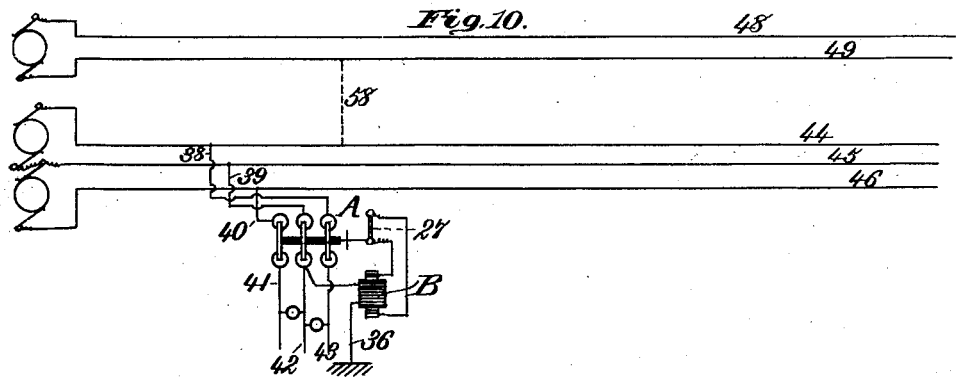
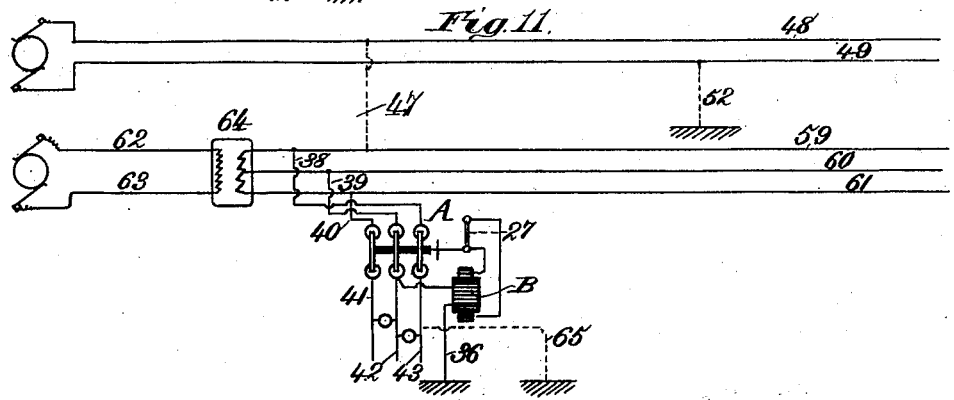
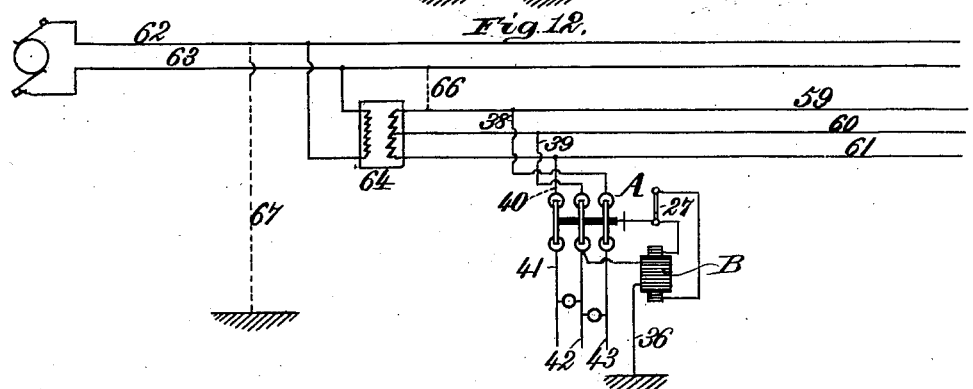
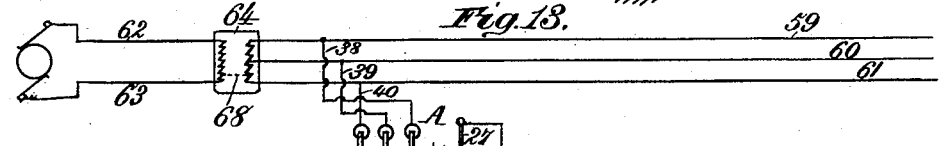
Witnesses,
Inventor:
Lyman C. Reed.
By James L. Norris
Atty.

UNITED STATES PATENT OFFICE.

LYMAN C. REED, OF NEW ORLEANS, LOUISIANA.

PROTECTIVE SYSTEM AND APPARATUS FOR HIGH-TENSION ELECTRIC CURRENTS.

SPECIFICATION forming part of Letters Patent No. 645,007, dated March 6, 1900.

Application filed July 17, 1899. Serial No. 724,066. (No model.)

*To all whom it may concern:*

Be it known that I, LYMAN C. REED, a citizen of the United States, residing at New Orleans, in the parish of Orleans and State of Louisiana, have invented new and useful Improvements in Protective Systems and Apparatus for High-Tension Electric Currents, of which the following is a specification.

My invention relates to a system of electrical distribution and to an automatic circuit-breaker to be used in connection therewith.

The primary object of the invention is to provide an automatic protective system whereby the entrance of a current dangerous to life or property into a house or other object of electrical supply is rendered impossible.

A further object of the invention is to provide an improved construction of circuit-breaker adapted to be operated by either direct or alternating current, by means of which a building or other object of electrical supply may be automatically cut out from its source of supply in the event that the service-wires become charged with a dangerous current.

Other objects and advantages of the invention will hereinafter appear.

The invention consists of a system of electrical distribution, a circuit-breaker therein, a ground-circuit from one leg of said system, and a solenoid-transformer for throwing said circuit-breaker into operation, the primary of which is in said ground-circuit.

It also consists of a circuit-breaker comprising a switch, a service-circuit through said switch, a solenoid-transformer, a core therefor operatively connected to said switch, a fuse for normally holding said switch closed, a grounded circuit through the primary of said solenoid-transformer connected with the service-circuit through said switch, and a closed circuit including said fuse and the secondary of said solenoid-transformer.

The invention also consists in certain refinements of the system and details of construction of the instrument which will be more fully hereinafter described and claimed.

In the drawings forming part of this specification, Figure 1 is a vertical sectional view illustrative of my improved circuit-breaker, the same being shown adapted to the three-wire system of distribution. Fig. 2 is a horizontal sectional view through the upper part of the casing, showing the operative parts in plan. Fig. 3 is a vertical sectional view taken at right angles to Fig. 1. Figs. 4 to 13, inclusive, are diagrammatic views illustrative of my improved system and the application of my instrument thereto.

Like reference letters and numerals indicate like parts in the several views.

As the circuit-breaker shown is especially adapted for and intended to be used in connection with the system of distribution, a detail description of the same will be entered into first.

The operative parts of the instrument are mounted in a weatherproof box or casing 1, preferably constructed of cast-iron, provided with suitable means whereby it may be supported and having a door 2 hinged to one side thereof. The free end of said door is provided with a metallic strap 3, having a slot therein which is adapted to receive a bolt, screw, or other threaded projection 4 on one of the sides of the casing, upon which screw or bolt is mounted a wing-nut 5, by means of which the door may be locked in its closed position.

Secured in a horizontal position within the casing 1, at a point intermediate the top and bottom thereof, is a bed-plate 6, preferably constructed of porcelain, slate, marble, or other like non-conducting material, to which is secured metallic mercury-cups 7 8 9 10 11 12. These cups are arranged in pairs, as shown, and are adapted to receive the contact-strips 13 14 15, which bridge across and form electrical connection between the cups 7 and 8, 9 and 10, and 11 and 12, respectively. The said contact-strips are secured at points intermediate their ends to a bar 16 of insulating material and with said bar constitute a switch. It is obvious, however, that in lieu of this particular switch I may substitute any other form of contact-switch. The bar 16 is in turn secured to a lever 17, of conducting material, which is fulcrumed upon the metallic uprights or supports 18 19. The said supports are secured to the bed-plate 6, and the rear end of said lever is provided with an elongated slot 20. Said slot receives a pin 21, which extends transversely through the stem 22 of a soft-iron core 23, and said stem is itself slotted, as shown at 24, to receive the end of the lever 17, and the upper and lower walls of the slot 24 are inclined or beveled, so as to prevent binding action between said lever and said stem when they are moved. Also secured to the bed-plate 6 is a bracket or support 25, having a horizontal overhanging arm 26 thereon, to which and to the upper end of the stem 22 is secured a fuse 27 of sufficient tensile strength to maintain the core 23 and the parts connected thereto in their raised positions. Of course any other operative connection between the core 23 and the switch may be employed in lieu of that shown and above described without departing from my invention.

The core 23 fits within and is adapted to be actuated by what I term a "solenoid-transformer," which term is used for convenience in this specification and in the claims to indicate a device comprising two coils located in inductive relation to each other, adapted to operate as an ordinary solenoid with a direct current and as a transformer with an alternating current. The solenoid-transformer, as herein shown, is made up of an inner layer 28 of insulating material, a secondary coil 29, a layer 30 of insulating material, and an outer primary coil 31. The secondary 29 is in a normally-closed circuit including the wire 32, leading from one end of said coil to a metallic screw or binding-post 33 on the bracket 25, and a wire 34, leading from the opposite end of said coil and connected to the upright or support 18, the circuit being completed through the lever 17, stem 22, fuse 27, and bracket 25 to screw or binding post 33. The primary 31 of the solenoid-transformer is in a grounded circuit leading from the neutral mercury-cup 10 on the house side of the instrument through the wire 35 and to ground through the wire 36, the latter wire passing down through the bottom of the casing 1 through insulator 37.

The service-wires 38 39 40 lead in through the bottom of the casing 1 to the mercury-cups 7 9 11, respectively, and the wires 41 42 43 lead out through the bottom of the casing from the cups 8 10 12, respectively, to the lights or other translating devices that are to receive the current. Connection is made between the leading-in and leading-out wires by way of the contact-strips 13 14 15 and the mercury-cups with which they respectively coöperate. It will thus be seen that the neutral service-wire 39 to 42 is grounded on the house side of the instrument through the primary coil 31 of the solenoid-transformer.

The feature of my improved system consists in grounding the neutral wire through the circuit-breaker above described. This is clearly illustrated in a number of its different phases in the diagrammatic views presented. In Fig. 4 is shown the ordinary system of three-wire distributing-mains 44 45 46, either alternating or direct current, with house-service wires 38 39 40 leading therefrom, crossed, as shown at 47, with high-tension current, either alternating or direct, from high-tension mains 48 49, the wires from both high and low tension systems being free from grounds, but with the usual dialectric stress (indicated by 50) incident to all extended circuits.

Fig. 5 shows a similar system, except that the neutral leg 45 of the low-tension mains is grounded at one or more points of the distribution, as at 51, that one leg of the high-tension system is accidentally grounded, as at 52, and that the cross 47 between the high and low tension systems occurs from the leg of the former opposite that which is grounded.

Fig. 6 is a view similar to Fig. 5, showing my improved circuit-breaker interposed in the house-service from the low-tension mains, the instrument as a whole being indicated by the letter A.

Fig. 7 is a view similar to Fig. 6, except that the ground 51 on the neutral leg 45 of the low-tension mains is removed and is placed at some point in the house-wiring, as shown at 53.

Fig. 8 is a view similar to Fig. 6, except that all three legs of the low-tension mains are accidentally grounded at some point of their distribution, as shown at 54 55 56.

Fig. 9 is a view similar to Fig. 6, with the cross 57 between the high and low tension mains leading from the leg of the former, which is grounded.

Fig. 10 is a view similar to Fig. 6, except that no ground is shown on either high or low tension system save that through the solenoid-transformer B of circuit-breaker A. The cross 58 between high and low tension systems may lead from either leg of the former.

Figure 1:
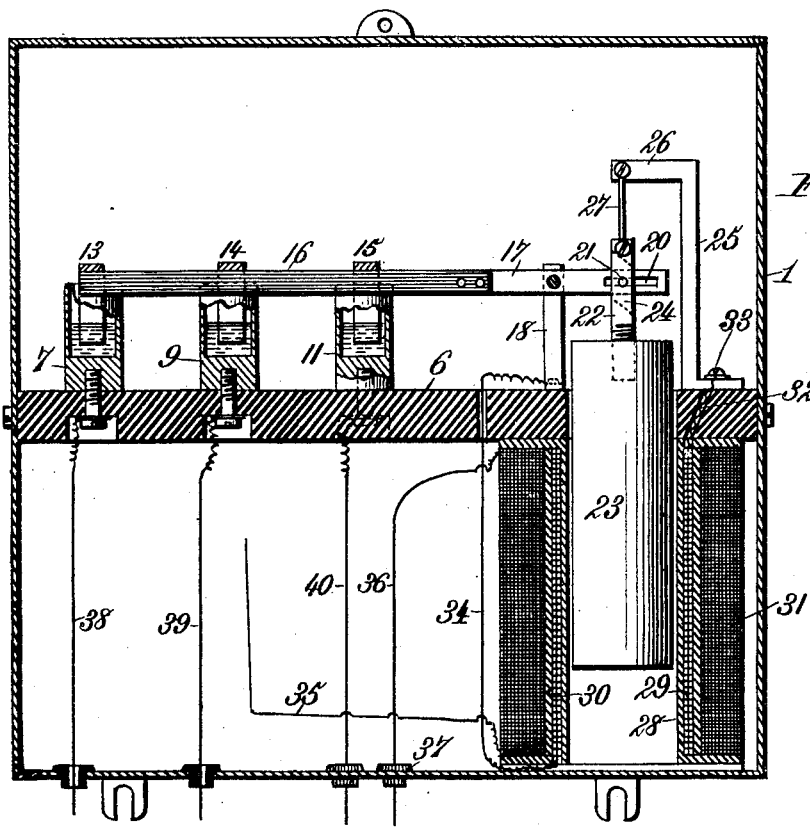
Figure 2:
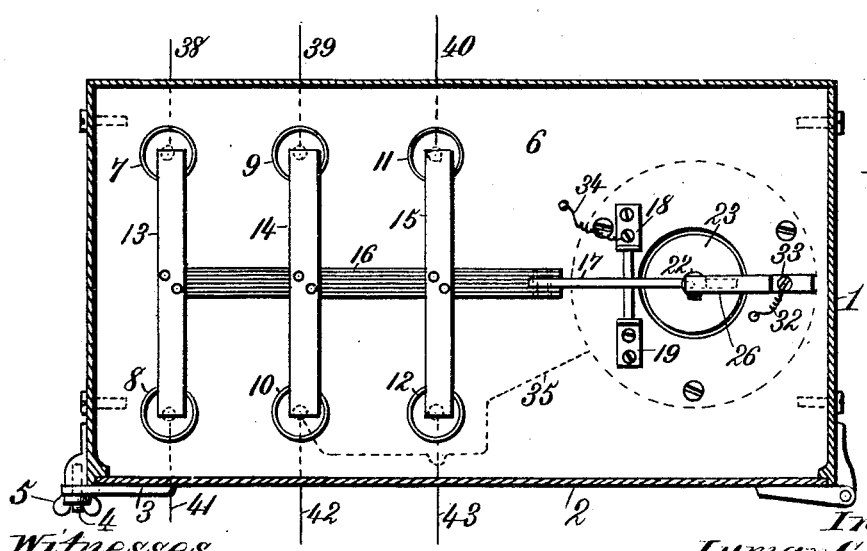

Fig. 11 is a view illustrative of an isolated low-tension alternating-current three-wire system of mains 59 60 61, fed from high-tension alternating-current primary mains 62 63 through transformer 64, grounded, as at 65, at some point in house distribution, and crossed, as at 47, with high-tension mains 48 49, either alternating or direct, on the leg of the latter opposite the accidental ground 52 thereon.

Fig. 12 is a view similar to Fig. 11, showing low-tension alternating-current three-wire system of distributing-mains 59 60 61 free from grounds, except through solenoid-transformer B of circuit-breaker A, and crossed, as at 66, with one leg of the feeding primary, the opposite leg of which is accidentally grounded, as at 67.

Fig. 13 is a view similar to Fig. 12, except that in this instance the cross between primary and low-tension mains occurs, as at 68, through defective transformer.

From the foregoing description it is thought that the operation of my invention will be readily understood. The drawings show the circuit-breaker in its normal position closed and ready to operate. The iron core 23 is raised and held in this position by the fuse 27, the contact-strips 13, 14, and 15 dipping into the mercury-cups 7 and 8, 9 and 10, and 11 and 12 and allowing the current to pass between the service-wires 38 and 41, 39 and 42, and 40 and 43 to the lamps or other devices to be fed thereby and the neutral service-wire 39 to 42 being connected on the house side to ground through the wire 35, primary 31 of solenoid-transformer, and wire 36.

If the high-tension current with which the distributing-mains become charged be direct, the solenoid-transformer acts as an ordinary solenoid, the passage of the current to ground through the primary 31 thereof energizing the same and causing it to exert a direct pull upon the iron core 23. The force exerted is sufficient to break the supporting-fuse 27 mechanically, and the core 23 is drawn down, depressing the rear end of the lever 17 and elevating the opposite end thereof, which carries the contact-strips 13 14 15, breaking the circuit to the house from the wires 38, 39, and 40. The action under these circumstances makes no use of the closed secondary 29 in the opening of the switch, and the fuse 27 becomes a mere mechanical support for the core 23, which the magnetic pull breaks.

If the high-tension current be alternating, however, some means must be provided for preventing the current from being choked off by its self-induction in its path to ground. For this purpose the secondary coil 29 with few turns compared with the primary 31 is employed, which coil is closed through the supporting-fuse 27, thereby providing for the passage of the current through the primary 31 and also for the melting of the supporting-fuse 27 and consequent operation of the switch. This passage of the current through the primary 31 induces a current of great amperage and small voltage in the closed secondary 29, which operates without any arcing to melt the fuse 27, thereby freeing the core 23 and opening the switch. In this case owing to the very inefficient character of the transformer a portion of the primary energy is not transformed to a current of lower potential in the secondary 29, but acts with magnetic effect on the core 23. Furthermore, the fuse 27 melts and the secondary circuit is opened before the contact-strips 13 14 15 leave the mercury-cups, and for this space of time the coil 31 acts as a magnet only. Thus it is seen that with an alternating current of high tension my circuit-breaker acts magnetically and also by gravity after utilizing an induced low-tension secondary current of large volume and low potential to melt the fuse 27, and thereby electrically, as well as mechanically, sever the support of core 23. It will also be noted that at no time except the instant of opening can the device be considered as a current-consumer. It therefore overcomes an objection to which such instruments are liable.

Another point to be noted is that when the cross is made by a high-tension alternating current the fuse 27 melts, as stated above, before the switch-contacts are broken and the circuit through the secondary 29 of the solenoid-transformer is opened, thereby leaving the primary coil 31 thereof to act as a choke-coil, and thus reducing to a minimum the flow to ground of high-tension current in the circuit which has to be opened by the switch.

It will be noted, further, that the low-tension service-circuit crossed by a high-tension current is broken simultaneously at two points at opposite ends of the contact-strips 13 14 15. This fact and the rapidity of the break accomplished by my device prevents absolutely any arcing at the time of break.

The iron core 23 is of sufficient weight to overbalance the weight of the lever 17 and the parts connected thereto, and thus serves to exert a strong gravity pull, which opens the switch with an accelerated rapidity and prevents the closing of the switch when once opened. When the switch has been opened, the integrity of the house and grounded circuits can only be restored by opening the inclosing box 1 and inserting a new fuse 27.

I have illustrated the secondary 29 of the solenoid-transformer on the inside of the primary 31. It is obvious, however, that these positions may be reversed or changed in any other way so long as the two coils are in inductive relation to each other and in operative relation to the core 23.

Figs. 4 and 5 illustrate, diagrammatically, the systems and conditions which the circuit-breaker is designed to protect. 48 49 represent high-tension alternating or direct current transmission-mains, which may or may not feed the distributing-mains 44 45 46, which in turn feed the house-service wires 38 39 40. 50 represents the dialectric stress between high-tension system and the ground, which always exists in every extended circuit. 47 represents any cross or breakdown between high-tension and low-tension mains. Should the cross at 47 occur when both high-tension and low-tension systems are free from all grounds, the cross would permit no current to flow between high-tension wires and ground; but the low-tension system would be placed under the same stress as the high-tension, which would tend to break down the insulation to ground and form a discharge thereto. Should the neutral wire of the low-tension system be grounded either permanently, as shown at 51 in Fig. 5, or through the solenoid-transformer B, as shown in other figures, then the stress represented by 50 would discharge to ground without tending to break down the insulation at other points. Should, however, the insulation of the high-tension circuit break down and 50 develop into a ground 52, Fig. 5, whose circuit would be completed through a ground on the low-tension distributing-mains, as at 51, Fig. 5, (the ground 51 representing the permanently-grounded neutral system,) the high-tension current would distribute itself over all portions of the distributing-mains and house-wires, seeking parallel paths to ground. The main current, however, would flow through the path of least resistance to the ground 51. Now if the ground at 52 be of low resistance and the ground at 51 be of low resistance and the cross at 47 be also of low resistance then either 52, 51, or 47 would be burned in two unless the fuses, circuit-breakers, or other devices controlling the high-tension system should open the circuit elsewhere; but if one or more of the resistances at 52, 51, or 47 be high enough to prevent a heavy flow of current then the whole system would become charged with a high-tension current tending to break down the insulation at various points, particularly in the house-wiring, where combination fixtures and other weak points exist, thus causing arcs, short circuits, and fires besides danger to life. On the other hand, if the neutral be not permanently grounded, as shown in Fig. 5, but weak points in house-wiring develop into grounds, then the flow of current would take place over the house-fuses, causing destructive arcs, burn-outs, and consequent fires.

The practice of grounding the neutral wire of distributing systems is coming more and more into favor, together with the grounding of the neutral points of the secondaries of transformers, the effort being to obtain protection from high-tension crosses or breakdowns in this way. I maintain, as shown above, that under no condition does this sytem afford the protection desired when a ground also occurs on the high-tension circuit. The desired protection may be obtained, however, under all conditions by the grounding of the neutral wire of a whole system or the neutral of individual transformers through my circuit-breaker in the manner set forth. As the number of these instruments increases on any system of distributing-mains the ground on the neutral becomes of lower resistance and greater capacity, and should a high-tension cross occur the flow of current to ground takes place through the primaries of the solenoid-transformers, opening the switches and leaving the cross on the outside lines until cleared.

The diagrammatic views of the drawings are illustrative of many of the various conditions found in practice.

Fig. 6 illustrates the grounded neutral system with my automatic circuit-breaker A interposed in the house-service, furnishing an additional ground through the primary of the solenoid-transformer B. Assuming the high-tension current to have an electromotive force of two thousand volts, alternating, and the combined resistance of 52, 51, and 47 and any intermediate connections to be only one ohm, a condition which could hardly be realized in practice, and assuming that the ohmic and inductive resistance of the ground through the primary of the solenoid-transformer B to be one hundred ohms, if only one circuit-breaker be installed on the system then the current flow through the solenoid-transformer would be one-hundredth part of the total flow to ground, or about twenty amperes, immediately operating the switch. If fifty circuit-breakers were installed, the resistance of the grounds therethrough in multiple would be about two ohms and the solenoid-transformers would receive current in the ratio of about one to two, or about twelve amperes each, immediately operating the switch. If one thousand circuit-breakers were installed, each would receive approximately one ampere, which would operate the switch at once. If the combined resistances of 52, 51, and 47 and intermediate wires be two thousand ohms, with approximately only one ohm in 47 and 51, then the instrument would receive about one one-hundredth of an ampere, which would operate the switch. If one hundred instruments be installed, each would still receive approximately one two-hundredth of an ampere, if the resistance of ground 51 be taken as one-half ohm, which would be sufficient to operate the switch. In other words, the solenoid-transformer is designed to operate on "feebly-dangerous" or "sneak" currents as well as on heavy ones and can be made as sensitive as desired. If the high-tension current be a five-hundred-volt trolley-current and 52 is a ground of low resistance, then any cross, as at 47, with a low-tension system, where the neutral is grounded through low resistance, at once burns off the cross or opens the circuit-breakers at the power-house, or if this cross arcs, due to high resistance at 47, or the circuit fails to open or if the ground 51 be not of low resistance then the current opens every switch on the system. If the ground 51 have a small resistance and neither the circuit-breakers at the power-house open nor the cross 47 burns off, then the current divides itself to ground through the various circuits, each instrument receiving its share, which at once operates the switch. Currents of higher potential simply increase the efficiency of the device, insuring more pronounced action.

Fig. 7 is illustrative of the ordinary system without any permanent grounding of the neutral wire except through the circuit-breaker A. 53 indicates an accidental ground or grounds at some point in the house-wiring that may be in actual existence or develop after a cross with a high-tension current. In this case the solenoid-transformer is in multiple with these grounds and operates as explained above. Should the house-circuits be clear from grounds, the solenoid-transformer opens the switch, and thereby prevents any development of trouble due to cross.

The grounds 54 55 56 on the low-tension mains illustrated in Fig. 8 when crossed with high-tension currents are in multiple to form one ground. In this case the solenoid-transformer B acts in the same manner as above described.

Fig. 9 illustrates a cross 57 with the grounded leg 49 of high-tension current, the other leg 48 of which is free from grounds. In this case no flow of current can occur until the insulation on the other leg 48 breaks down. Until this happens, therefore, there is no flow of high-tension current through the house-wiring or through the solenoid-transformer, and consequently the switch does not open. When a ground on leg 48 does occur, the switch is opened.

In Fig. 10 are illustrated the high and low tension systems free from grounds other than through the solenoid-transformer B. In this case the capacity discharge of the high-tension system takes place to ground through solenoid-transformer, and no other current then flows until grounds on primary occur, when the circuits are completed and the switch opens, as described above.

Fig. 11 is substantially the same as Fig. 7, the difference being that the distributing-mains 59 60 61 constitute an alternating isolated low-tension system. The action of the circuit-breaker is the same as in the other figures.

Fig. 12 shows a cross 66 between the primary and secondary of isolated low-tension system, and Fig. 13 shows a similar cross 68 through defective transformer 64, the action of the circuit-breaker A being the same as in other cases.

It will thus be seen that it is immaterial what happens on the circuit in which the circuit-breaker is interposed and that the same operates under all necessary conditions.

While my improvements have been described in connection with the three-wire system of distribution, the same is intended to be used with any system of distribution in which one leg is grounded through the primary of the solenoid-transformer of the circuit-breaker.

Having now described my invention, what I claim as new, and desire to secure by Letters Patent, is—

1. In a system of electrical distribution, a circuit-breaker, a ground-circuit from one leg of said system, and a solenoid-transformer for throwing said circuit-breaker into operation, the primary of which is in said ground-circuit.

2. In a system of electrical distribution, in which a neutral distributing-conductor is employed, a circuit-breaker, a ground-circuit from said neutral conductor, and a solenoid-transformer for throwing said circuit-breaker into operation, the primary of which is in said ground-circuit.

3. In a system of electrical distribution, a normally-grounded neutral, a circuit-breaker therein for cutting out the ground, and a solenoid-transformer for actuating said circuit-breaker, the primary of which is connected with said neutral.

4. In a three-wire system of electrical distribution having the neutral leg thereof grounded, a switch therein, and a solenoid-transformer for operating said switch to cut out the ground, the primary of which is connected with the ground from said neutral leg.

5. In a three-wire system of electrical distribution, a house-circuit having the neutral leg thereof grounded, a circuit-breaker for cutting out the house-circuit and the ground, and a solenoid-transformer for actuating said circuit-breaker, the primary of which is connected with the ground from said neutral leg.

6. In a three-wire system of electrical distribution, a house-circuit, a switch controlling the same, a solenoid-transformer for operating the switch, and a grounded circuit from the neutral leg of the house-circuit through the primary of said transformer.

7. In an automatic electric-circuit breaker, installed in a three-wire low-tension system of electrical distribution, a switch, and a solenoid-transformer adapted to open said switch, the neutral leg of said system being grounded through said solenoid-transformer, whereby said switch will be actuated by a high-tension current to cut out the ground.

8. In an automatic electric-circuit breaker installed in the house-circuit of a three-wire low-tension system of electrical distribution, a switch, and a solenoid-transformer adapted to open said switch, the neutral leg of said circuit being grounded through said solenoid-transformer, whereby said switch will be actuated by a high-tension current to disconnect said house-circuit and cut out the ground.

9. In an automatic electric-circuit breaker, a switch, a service-circuit through said switch, a solenoid-transformer for operating said switch, a grounded circuit through the primary of said solenoid-transformer, and connections between the grounded circuit and the service-circuit, through said switch.

10. In an automatic electric-circuit breaker, a switch, a service-circuit through said switch, a solenoid-transformer, a core therefor operatively connected to said switch, a grounded circuit through the primary of said solenoid-transformer, and connections between said grounded circuit and the service-circuit, through said switch.

11. In an automatic electric-circuit breaker, a switch, a service-circuit through said switch, a solenoid-transformer, a core therefor operatively connected to said switch, a fuse connected to said core for normally holding said switch closed, and a grounded circuit through the primary of said solenoid-transformer connected with the service-circuit, through said switch.

12. In an automatic electric-circuit breaker, a switch, a service-circuit through said switch, a solenoid-transformer, a heavy core therefor operatively connected to said switch, a fuse supporting said core in raised position for normally holding said switch closed, and a grounded circuit through the primary of said solenoid-transformer connected with the service-circuit, through said switch.

13. In an automatic electric-circuit breaker, a switch, a service-circuit through said switch, a solenoid-transformer, a core therefor operatively connected to said switch, a fuse for normally holding said switch closed, a grounded circuit through the primary of said solenoid-transformer connected with the service-circuit, through said switch, and a closed circuit including said fuse and the secondary of said solenoid-transformer.

14. In an automatic electric-circuit breaker, a switch, a service-circuit through said switch, a solenoid-transformer, an iron core therefor operatively connected to said switch, and a supporting-fuse for said core normally holding said switch in its closed position, the said solenoid-transformer comprising a primary coil in a grounded circuit and connected with the service-circuit through said switch, and a secondary coil of a comparatively-small number of turns, in inductive relation with said primary coil, the circuit through said secondary being closed through said supporting-fuse, whereby, with a high-tension direct current, the primary coil alone acts to exert a pull on the core and break said fuse mechanically, opening the switch by combined magnetic and gravity action, and whereby with a high-tension alternating current, both primary and secondary coils act together to produce a transformer of low efficiency, inducing a current of large volume and small voltage in the secondary coil by which said fuse is melted without arcing, and permitting gravity to open switch by weight of core, to which force is added simultaneously the magnetic pull exerted by the untransformed energy flowing through the primary coil.

15. In an automatic electric-circuit breaker, a switch, a service-circuit through said switch, a solenoid-transformer, a core therefor operatively connected to said switch, a fuse for normally holding said switch closed, a grounded circuit through the primary of said solenoid-transformer connected with the neutral wire of service-circuit through said switch, and a closed circuit including said fuse and the secondary of said solenoid-transformer.

16. In an automatic electric-circuit breaker, the combination with a box or casing and a base-plate of insulating material therein, of contacts arranged in pairs on said base-plate, conducting strips or bridges for the members of each pair of contacts, an insulated bar secured to said strips, a lever secured to said bar having a slot therein, a solenoid-transformer, an iron core therefor whose stem is provided with a slot through which said lever passes, a transverse pin in said stem extending through the slot in said lever, a support, a fuse secured to said support and to the stem of said core for supporting the latter and normally holding said strips or bridges in engagement with said contacts, a service-circuit leading to one set of said contacts, and from the other, a grounded circuit leading from the neutral wire on the other set of said contacts, through the primary coil of the solenoid-transformer, and a circuit through the secondary coil of said solenoid-transformer normally closed through and by said fuse.

In testimony whereof I have hereunto set my hand in presence of two subscribing witnesses.

LYMAN C. REED.

Witnesses:
  M. C. SONIAT,
  L. RENE VILLARS.